United States Patent
Kuroda et al.

(10) Patent No.: US 9,557,208 B2
(45) Date of Patent: Jan. 31, 2017

(54) LIQUID LEVEL MEASURING APPARATUS, METHOD, AND PROGRAM

(71) Applicant: KABUSHIKI KAISHA TOSHIBA, Minato-Ku (JP)

(72) Inventors: Hidehiko Kuroda, Yokohama (JP); Naruhiko Mukai, Yokohama (JP); Osamu Kawakami, Yokosuka (JP); Makoto Takemura, Ota-Ku (JP); Yuka Takada, Minato-Ku (JP); Fujio Shiraishi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 184 days.

(21) Appl. No.: 14/369,513

(22) PCT Filed: Dec. 27, 2012

(86) PCT No.: PCT/JP2012/083855
§ 371 (c)(1),
(2) Date: Jun. 27, 2014

(87) PCT Pub. No.: WO2013/100046
PCT Pub. Date: Jul. 4, 2013

(65) Prior Publication Data
US 2014/0366626 A1    Dec. 18, 2014

(30) Foreign Application Priority Data
Dec. 28, 2011  (JP) ................................. 2011-289625

(51) Int. Cl.
G01F 23/28    (2006.01)
G01F 23/296   (2006.01)
G21C 17/035   (2006.01)
F01K 5/02     (2006.01)

(52) U.S. Cl.
CPC ............ *G01F 23/2965* (2013.01); *F01K 5/02* (2013.01); *G01F 23/2961* (2013.01);
(Continued)

(58) Field of Classification Search
CPC .. G01F 23/2962; G01F 23/284; G01F 23/296; G01F 23/2961; G01F 23/2967; G01F 23/2965; G01F 23/2968
(Continued)

(56) References Cited

U.S. PATENT DOCUMENTS 4,203,324 A * 5/1980 Baumoel ............. G01F 23/2965
                                                    367/908
4,320,659 A * 3/1982 Lynnworth ............... G01F 1/66
                                                    73/290 V
(Continued)

FOREIGN PATENT DOCUMENTS

JP   55-009103    1/1980
JP   61-274223    12/1986
(Continued)

OTHER PUBLICATIONS

International Preliminary Report on Patentability and Written Opinion issued Jul. 1, 2014 in PCT/JP2012/083855 (English Translation only).
(Continued)

*Primary Examiner* — Eric S McCall
*Assistant Examiner* — Mohammed E Keramet-Amircolai
(74) *Attorney, Agent, or Firm* — Oblon, McClelland, Maier & Neustadt, L.L.P.

(57) ABSTRACT

Provided is a liquid level measuring technique capable of measuring a liquid level with high accuracy even if a liquid stored in a container is boiling. The liquid level measuring apparatus includes: ultrasonic sensors each configured to transmit and receive an ultrasonic wave, the ultrasonic
(Continued)

sensors being respectively set at a plurality of positions on an outer surface of a container that stores a liquid; a transmission/reception controlling unit configured to set, as a target, any one of the ultrasonic sensors at the plurality of positions and control the transmission and reception of the ultrasonic wave of the target; an intensity detecting unit configured to detect an intensity of the ultrasonic wave that satisfies at least $2 \leq N$ (N: natural number), of the ultrasonic waves that are reflected N times on an inner surface of the container; a gas/liquid determining unit configured to determine which of the liquid and a gas a reflection point on the inner surface is in contact with, on a basis of the detected intensity of the ultrasonic wave; and a level determining unit configured to determine a liquid level of the liquid on a basis of gas/liquid determination results respectively derived by the ultrasonic sensors at the plurality of positions.

7 Claims, 5 Drawing Sheets (52) U.S. Cl.
CPC ...... *G01F 23/2967* (2013.01); *G01F 23/2968* (2013.01); *G21C 17/035* (2013.01)

(58) Field of Classification Search
USPC ...................................................... 73/290 V
See application file for complete search history.

(56) References Cited

U.S. PATENT DOCUMENTS

| | | | | |
|---|---|---|---|---|
| 4,934,191 A * | 6/1990 | Kroening | ............ | G01F 23/2965 376/258 |
| 5,195,058 A * | 3/1993 | Simon | ................ | G01F 23/2962 340/621 |
| 5,681,995 A * | 10/1997 | Ooura | ................... | G01N 29/11 376/249 |
| 5,880,364 A * | 3/1999 | Dam | ................... | G01F 23/2962 73/149 |
| 6,644,114 B1 * | 11/2003 | McEwan | ............... | G01F 23/284 73/290 R |
| 6,795,015 B2 * | 9/2004 | Edvardsson | .......... | G01F 23/284 342/118 |
| 2004/0173020 A1 * | 9/2004 | Edvardsson | .......... | G01F 23/284 73/290 V |
| 2008/0105331 A1 * | 5/2008 | You | ...................... | B67D 1/0871 141/198 |
| 2008/0190514 A1 * | 8/2008 | Lee | ...................... | B67D 1/0888 141/95 |
| 2008/0282794 A1 * | 11/2008 | Jirskog | ................. | G01F 23/284 73/292 |
| 2012/0287749 A1 * | 11/2012 | Kutlik | ................... | G01H 3/125 367/7 |

FOREIGN PATENT DOCUMENTS

| | | |
|---|---|---|
| JP | 11-218436 | 8/1999 |
| JP | 2002-340654 | 11/2002 |
| JP | 2003-315030 | 11/2003 |
| JP | 2008-203204 | 9/2008 |

OTHER PUBLICATIONS

International Search Report issued Mar. 19, 2013 in PCT/JP2012/083855 filed Dec. 27, 2012.

Extended European Search Report issued Aug. 19, 2015 in Patent Application No. 12861404.7.

* cited by examiner

LIQUID LEVEL MEASURING APPARATUS, METHOD, AND PROGRAM

TECHNICAL FIELD

The present invention relates to a liquid level measuring technique of measuring a liquid level of a liquid stored in a container, using ultrasonic waves.

BACKGROUND ART

A liquid level measuring technique using ultrasonic waves involves: placing ultrasonic sensors on an outer surface of a container that stores a liquid; transmitting ultrasonic waves from the ultrasonic sensors; and utilizing a phenomenon in which an intensity attenuation rate of each echo wave that is received after being reflected on an inner surface of the container is different depending on whether a reflection point of the echo wave is in contact with the liquid or a gas.

That is, an ultrasonic wave reflected on an interface between the gas and the container hardly attenuates, whereas an ultrasonic wave reflected on an interface between the liquid and the container observably attenuates.

Then, a liquid level is measured by recognizing which of the gas and the liquid a placement position of each of the plurality of ultrasonic sensors along a vertical direction of the inner surface of the container is adjacent to (for example, Patent Documents 1 and 2).

PRIOR ART DOCUMENTS

Patent Documents

Patent Document 1: Japanese Patent No. 3732642
Patent Document 2: Japanese Patent Laid-Open No. 2001-194210

SUMMARY OF THE INVENTION

Problems to be Solved by the Invention

Unfortunately, according to the above-mentioned liquid level measuring technique, in a case where the liquid stored in the container is boiling, the intensity attenuation rate of each reflected ultrasonic wave is influenced by steam in the gas and voids in the liquid, and varies depending on time and space. This causes a problem of a decrease in accuracy of liquid level measurement.

The present invention, which has been made in view of such circumstances as described above, has an object to provide a liquid level measuring technique capable of measuring a liquid level with high accuracy even if a liquid stored in a container is boiling.

Solution to Problem

The liquid level measuring apparatus includes: ultrasonic sensors each configured to transmit and receive an ultrasonic wave, the ultrasonic sensors being respectively set at a plurality of positions on an outer surface of a container that stores a liquid; a transmission/reception controlling unit configured to set, as a target, any one of the ultrasonic sensors at the plurality of positions and control the transmission and reception of the ultrasonic wave of the target; an intensity detecting unit configured to detect an intensity of the ultrasonic wave that satisfies at least 2≤N (N: natural number), of the ultrasonic waves that are reflected N times on an inner surface of the container; a gas/liquid determining unit configured to determine which of the liquid and a gas a reflection point on the inner surface is in contact with, on a basis of the detected intensity of the ultrasonic wave; and a level determining unit configured to determine a liquid level of the liquid on a basis of gas/liquid determination results respectively derived by the ultrasonic sensors at the plurality of positions.

Advantage of the Invention

The present invention provides a liquid level measuring technique capable of measuring a liquid level with high accuracy even if a liquid stored in a container is boiling.

DESCRIPTION OF EMBODIMENTS

First Embodiment

Hereinafter, an embodiment of the present invention is described with reference to the attached drawings.

Figure 1:
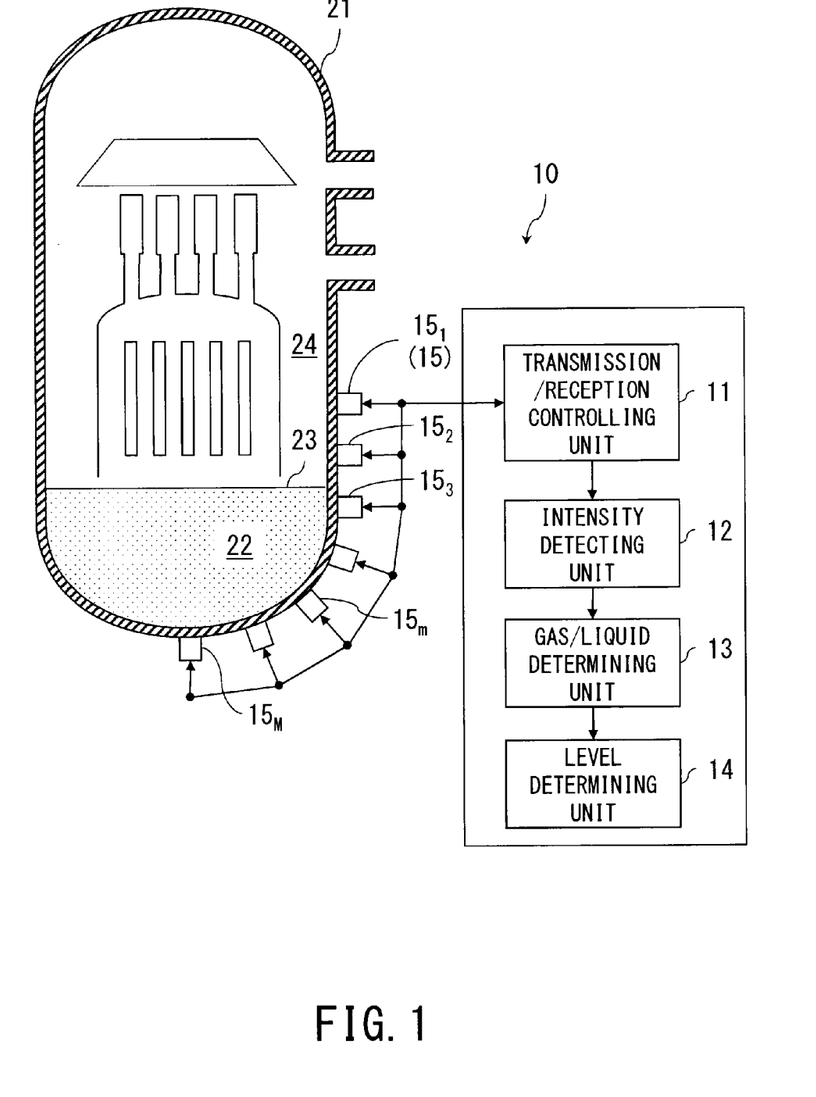
FIG. 1 is a block diagram illustrating a first embodiment of a liquid level measuring apparatus according to the present invention.

As illustrated in FIG. 1, a liquid level measuring apparatus 10 of a first embodiment includes: ultrasonic sensors 15 ($15_m$; 1≤m≤M) each configured to transmit and receive an ultrasonic wave, the ultrasonic sensors 15 being respectively set at a plurality of positions on an outer surface of a container 21 that stores a liquid 22; a transmission/reception controlling unit 11 configured to set, as a target, any one of the ultrasonic sensors 15 at the plurality of positions and control the transmission and reception of the ultrasonic wave of the target; an intensity detecting unit 12 configured to detect an intensity of the ultrasonic wave that satisfies at least 2≤N (N: natural number), of the ultrasonic waves that are reflected N times on an inner surface of the container 21; a gas/liquid determining unit 13 configured to determine which of the liquid 22 and a gas 24 a reflection point on the inner surface is in contact with, on a basis of the detected intensity of the ultrasonic wave; and a level determining unit 14 configured to determine a liquid level 23 of the liquid on a basis of gas/liquid determination results respectively derived by the ultrasonic sensors $15_m$ (1≤m≤M) at the plurality of positions.

A reactor pressure vessel that stores reactor water (liquid 22) is illustrated as the container 21, but the container 21 to which the liquid level measuring apparatus 10 of the embodiment is applied is not limited to such a reactor pressure vessel. The container 21 is applied to other containers such as a container the inside of which is hot and humid, a container filled with steam, a container in which voids are generated in the liquid 22, and a container placed in a harsh environment such as a hot and high-radiation area. Examples of such containers include a light-water reactor, a fast reactor, a spent fuel pool, boilers of a steam generator and the like, and various plants at the time of an accident.

The ultrasonic sensors 15 ($15_m$; $1 \leq m \leq M$) are each formed by, specifically, a heat-resistant oscillator made of lithium niobate, lithium tantalate, gallium phosphate, bismuth calcium titanate, langasite, or the like.

If such a heat-resistant oscillator is applied, even in a case where a severe accident such as a core meltdown occurs, a liquid level of the reactor pressure vessel can be reliably measured.

The ultrasonic sensors 15 are fixed to the outer surface of the container 21 with an intermediation of a contact medium such as soft metal and gel, whereby transmission efficiency of the ultrasonic waves can be improved.

A number M of the ultrasonic sensors $15_m$ ($1 \leq m \leq M$) is not limited. If one ultrasonic sensor 15 is moved, the ultrasonic sensor 15 can be set at the plurality of positions on the outer surface of the container 21.

An electromagnetic ultrasonic probe formed by a magnet and a coil can be applied to each ultrasonic sensor. The electromagnetic ultrasonic probe enables contactless transmission/reception of the ultrasonic wave, and facilitates a change of a position of attachment to the container 21.

Longitudinal and transverse ultrasonic waves can be transmitted/received by adjusting placements of the magnet and the coil. In a case where the container 21 is made of a magnetizable material, the electromagnetic ultrasonic probe (ultrasonic sensor 15) can be fixed by adsorption force of its constituent magnet. Further, a contact medium such as a couplant and water does not need to be used, and preprocessing is unnecessary. Hence, the ultrasonic sensor 15 does not damage the outer surface of the container 21, and can be attached to even a painted surface and an oxidized and corroded surface.

The transmission/reception controlling unit 11 includes a transmission circuit configured to transmit a high-voltage pulse to each ultrasonic sensor 15 in a given repetition period and a reception circuit configured to receive an echo signal sent from the transmission-destination ultrasonic sensor 15.

The transmission circuit transmits a high-voltage pulse having a waveform such as an impulse waveform, a square waveform, a triangular waveform, and a sawtooth waveform such that an ultrasonic wave is generated in a frequency range (several tens of kHz to several tens of MHz) in which propagation attenuation in a steel material is relatively small.

The transmission/reception controlling unit 11 transmits and receives the ultrasonic wave to and from any one of the ultrasonic sensors $15_m$ at the plurality of positions, and performs gas/liquid determination thereon. After that, the transmission/reception controlling unit 11 similarly transmits and receives the ultrasonic wave to and from another ultrasonic sensor $15_{m+1}$.

The intensity detecting unit 12 includes an electronic circuit that performs frequency filtering and voltage amplification on a signal waveform (see FIG. 6) to thereby obtain a signal intensity thereof. The signal waveform is outputted by each ultrasonic sensor 15 after receiving an ultrasonic echo from the inner surface of the container.

The ultrasonic wave that is transmitted from the ultrasonic sensor 15 set on the outer surface of the container 21 toward the inner surface of the container 21 is divided into a component transmitted through the inner surface and a component reflected on the inner surface. Then, the reflected component is divided into a component that is transmitted through the outer surface to be detected by the ultrasonic sensor 15 and a component that is reflected again to head for the inner surface.

Such reflection continues until the ultrasonic wave disappears due to attenuation and scattering, and an ultrasonic echo having various numbers of times N of reflection on the inner surface of the container is received by the ultrasonic sensor 15.

Here, peak waveforms of an echo signal shown in each of FIG. 6 respectively correspond to one-time reflection, two-time reflections, . . . , N-time reflections on the inner surface of the container 21 in order from a left side.

A signal intensity of the ultrasonic echo received by each ultrasonic sensor 15 is large when the reflection point on the inner surface of the container 21 is in the gas 24, and is small when the reflection point is in the liquid 22. Moreover, as the number of repetitions of reflection in a wall of the container 21 increases, a difference in signal intensity between the inside of the gas and the inside of the liquid becomes more noticeable.

The reason for this is described. A reflectance R on each of the inner surface and the outer surface is represented by the following Expression (1). Here, a medium 1 is a steel material that forms the container 21, and a medium 2 is a coolant (liquid 22) or the gas 24 stored in the container 21. In a case where the medium 2 is the gas 24, a reflectance Ra is equal to 1. In a case where the medium 2 is the coolant (liquid 22), roughly, a reflectance Rw is equal to 0.94 to 0.97 although the reflectance has temperature dependence. Meanwhile, in a case where the coolant (liquid 22) contains voids, the reflectance Rw may be equal to or more than 0.97 in some cases.

$$R=(Z_1-Z_2)/(Z_1+Z_2) \quad (1)$$

($Z_1$: an acoustic impedance of the medium 1, $Z_2$: an acoustic impedance of the medium 2)

Each time the number of times N of reflection increases, a difference in signal intensity between: a case where the medium 2 at the reflection point of the ultrasonic wave is the liquid 22; and a case where the medium 2 thereat is the gas 24 more noticeably appears, that is, becomes $(Ra/Rw)^N$ times.

For this reason, the intensity detecting unit 12 in the first embodiment detects the signal intensity of the ultrasonic wave that satisfies $2 \leq N$. A specific value for N is experimentally selected such that the difference in signal intensity between the inside of the gas and the inside of the liquid more noticeably appears and that an S/N ratio can be sufficiently secured.

Such a signal intensity of the ultrasonic wave can be obtained by searching for a local maximum value of echo signals acquired in chronological order.

Meanwhile, if a wall thickness of the container 21 and a sound speed are known, a time when a signal intensity corresponding to each of the N-time reflections is detected can be calculated from a propagation speed of the ultrasonic wave. An intensity of an echo signal acquired at the time obtained through such calculation can be defined as the signal intensity corresponding to each of the ultrasonic echoes in the N-time reflections.

The gas/liquid determining unit 13 determines which of the liquid 22 and the gas 24 the reflection point on the inner surface of the container 21 is in contact with, on a basis of the detected intensity of the ultrasonic echo.

Specifically, because propagation attenuation of the ultrasonic wave in the wall of the container 21 and acoustic impedances of the steel material, the coolant, and the gas are known, the signal intensities of the echo waves in the N-time reflections can be analytically obtained according to Expression (1), for both cases where the reflection point is in the gas and where the reflection point is in the liquid.

The gas/liquid determining unit 13 recognizes which of an analytical value in the liquid and an analytical value in the gas the detection value of each signal intensity obtained by the intensity detecting unit 12 matches with, to thereby determine which of the gas 24 and the liquid 22 a position of the corresponding ultrasonic sensor 15 is adjacent to.

Even in a case where the liquid 22 stored in the container 21 is boiled to contain voids or the gas 24 contains steam and where stability of the signal intensities of the echo waves is low due to an influence of such voids or steam, a difference in signal intensity among the echo waves in the N-time reflections ($2 \leq N$) is noticeable. Hence, it is easily recognized which of the analytical value in the gas and the analytical value in the liquid the detection value of each of the signal intensities of the echo waves in the N-time reflections ($2 \leq N$) matches with.

In addition to the above-mentioned method of comparing the detection value of each signal intensity with the analytical values, the gas/liquid determination of the position of the ultrasonic sensor 15 of interest can be performed by relative comparison with the signal intensities of the ultrasonic sensors 15 at the other positions. In this case, a position at which the signal intensity is relatively large can be recognized as the inside of the gas, and a position at which the signal intensity is relatively small can be recognized as the inside of the liquid.

According to another gas/liquid determining method, the signal intensity of the first ultrasonic echo in the N-time reflections at the time of attachment of each ultrasonic sensor 15 is stored in advance. Then, the signal intensities in the N-time reflections are continuously detected in chronological order, and a change in position of the liquid level 23 is recognized by utilizing a phenomenon in which: the detection value upon a change from the inside of the gas to the inside of the liquid noticeably changes, that is, becomes $(Rw/Ra)^N$ times; and the detection value upon a change from the inside of the liquid to the inside of the gas noticeably changes, that is, becomes $(Ra/Rw)^N$ times.

The level determining unit 14 determines the liquid level 23 of the liquid on the basis of the gas/liquid determination results respectively derived by the ultrasonic sensors $15_m$ ($1 \leq m \leq M$) at the plurality of positions.

Validity of the liquid level determination is checked on a basis of the following protocol.

(1) Each of determination results of in-gas determination and in-liquid determination is continuous, and the in-liquid determination and the in-gas determination do not alternately appear.

(2) The in-liquid determination does not appear above the in-gas determination.

Figure 2:
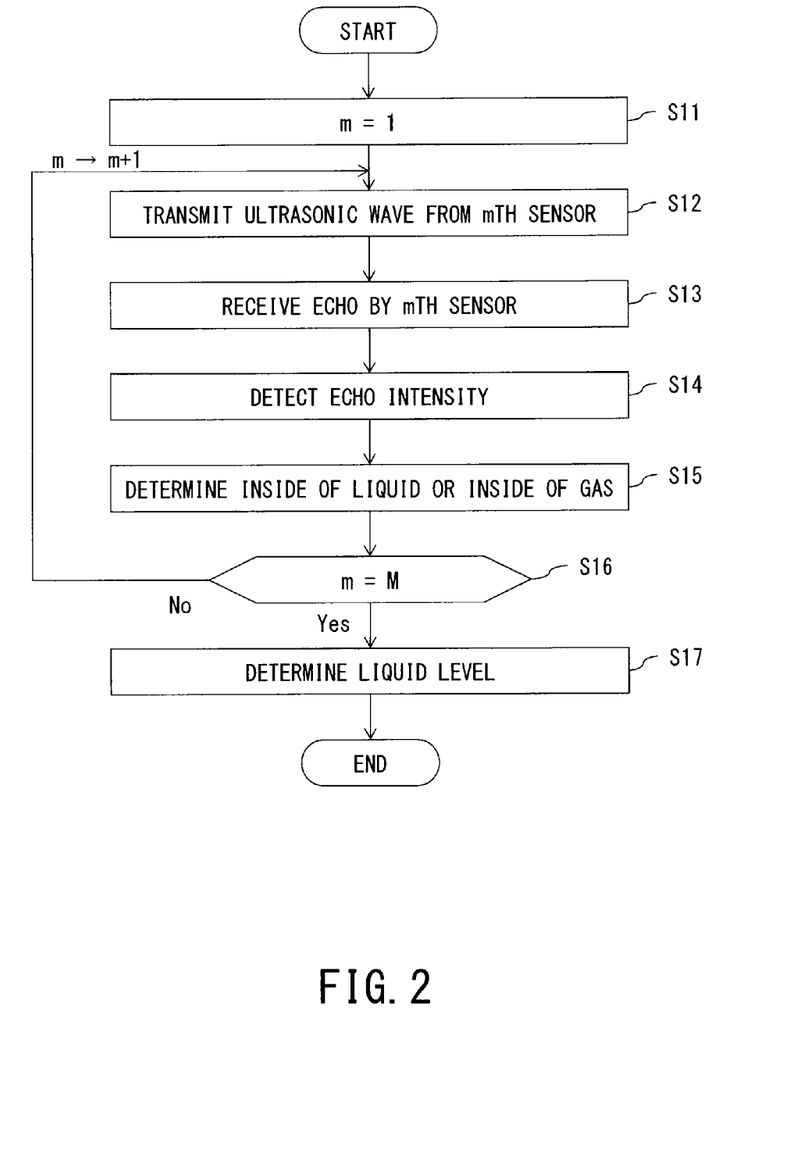
FIG. 2 is a flow chart for describing an operation of a liquid level measuring apparatus according to each embodiment.

An operation of the liquid level measuring apparatus according to each embodiment is described with reference to FIG. 2 (see FIG. 1 as appropriate).

First, any one of the ultrasonic sensors $15_m$ ($1 \leq m \leq M$) at the plurality of positions is set as a target (m=1) (S11). Then, an ultrasonic wave is transmitted from the ultrasonic sensor $15_1$ to the container 21 (S12). Consequently, the ultrasonic wave is reflected N times (N: natural number) on the inner surface of the container 21, and is received by the same ultrasonic sensor $15_1$ (S13).

Then, a signal intensity of an echo wave corresponding to the ultrasonic wave that satisfies $2 \leq N$, of the ultrasonic waves received as described above, is detected (S14). It is determined which of the liquid and the gas a placement position of the ultrasonic sensor $15_1$ is adjacent to, on a basis of the detection value (S15).

The gas/liquid determination is performed on a basis of a phenomenon in which: an ultrasonic wave when the liquid level 23 is below the ultrasonic sensor 15 at the position of interest is reflected on an interface in contact with the gas, and thus has a high reflectance; and an ultrasonic wave when the liquid level 23 is thereabove is reflected on an interface in contact with the liquid, and thus has a low reflectance.

In a case where the liquid in the container is boiling, the signal intensity of the echo wave varies, and a difference in reflectance between the inside of the gas and the inside of the liquid is slight due to an influence of steam in the gas and voids in the liquid, so that a degree of difficulty in the gas/liquid determination becomes higher. Fortunately, according to each embodiment, the signal intensity of the echo wave whose number of times N of reflection is equal to or more than two is examined, and hence accuracy of the gas/liquid determination can be kept high.

Subsequently, another ultrasonic sensor $15_2$ is set as a target, and an ultrasonic wave is transmitted from the target (S16; No, S12). The gas/liquid determination is repeated in a manner similar to the above (S13 to S15). Then, if the gas/liquid determination on the last ultrasonic sensor $15_N$ is ended (S16; Yes), the liquid level 23 is determined on the basis of the gas/liquid determination results respectively derived from all the ultrasonic sensors $15_m$ ($1 \leq m \leq M$) (S17).

Second Embodiment

Figure 3:
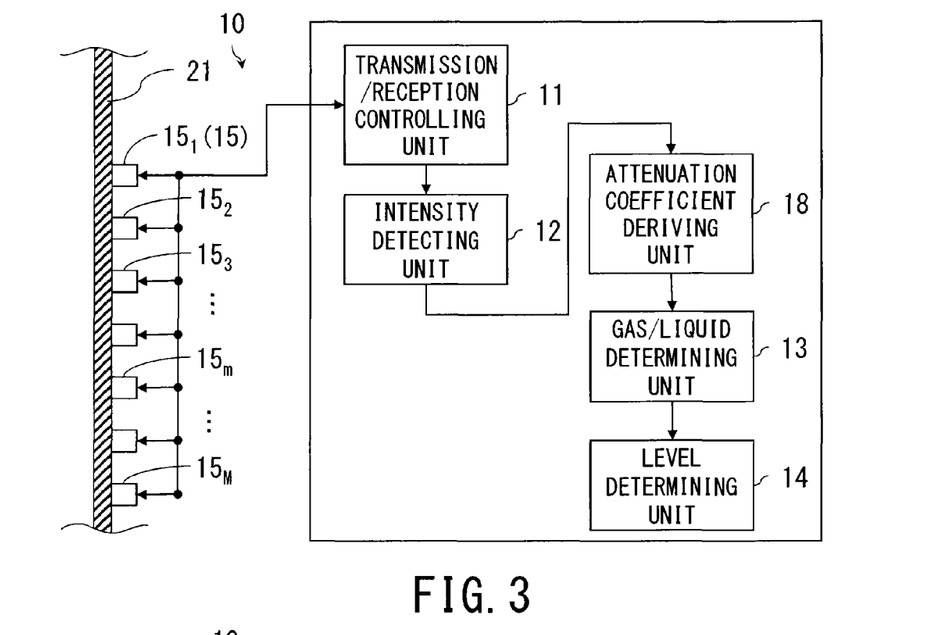
FIG. 3 is a block diagram illustrating a second embodiment of the liquid level measuring apparatus according to the present invention.

As illustrated in FIG. 3, a liquid level measuring apparatus 10 of a second embodiment includes an attenuation coefficient deriving unit 18 configured to derive an attenuation coefficient of an ultrasonic wave on a basis of an intensity that is attenuated after N-time reflections, in addition to the configuration (FIG. 1) of the first embodiment.

The gas/liquid determining unit 13 determines which of the liquid and the gas the reflection point on the inner surface is in contact with, on a basis of the attenuation coefficient.

In FIG. 3, portions that are the same as or correspond to those in FIG. 1 are denoted by the same reference signs, and redundant description thereof is omitted.

The attenuation coefficient deriving unit 18 includes an electronic circuit, and performs frequency filtering and voltage amplification on an echo waveform outputted by each ultrasonic sensor 15.

As indicated by broken lines in FIG. 6, the attenuation coefficient deriving unit 18 obtains an attenuation coefficient of an attenuation curve that connect peak points respectively corresponding to n-time reflections ($1 \leq n \leq N$).

Figure 6A:
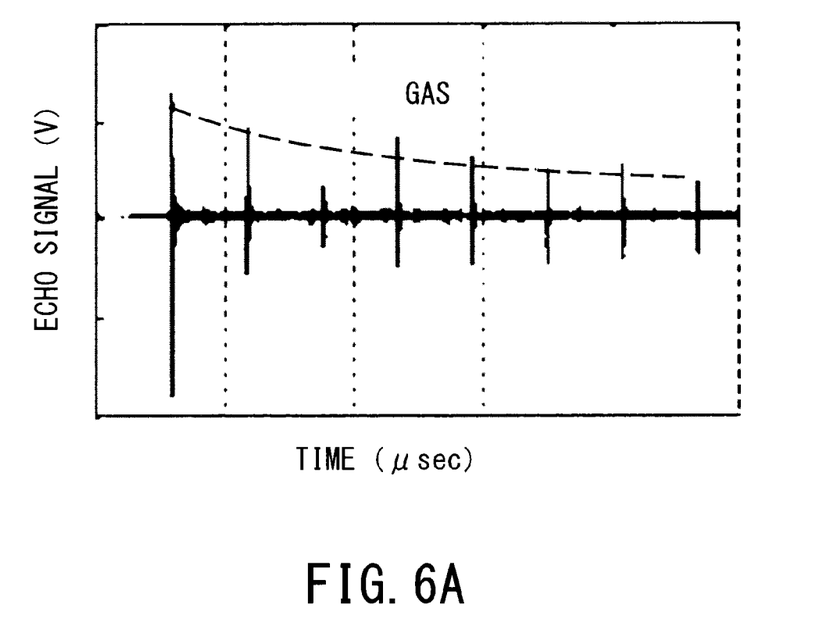
FIG. 6(A) is a graph showing a waveform of an ultrasonic wave (echo signal) reflected on an interface in contact with a gas.
Figure 6B:
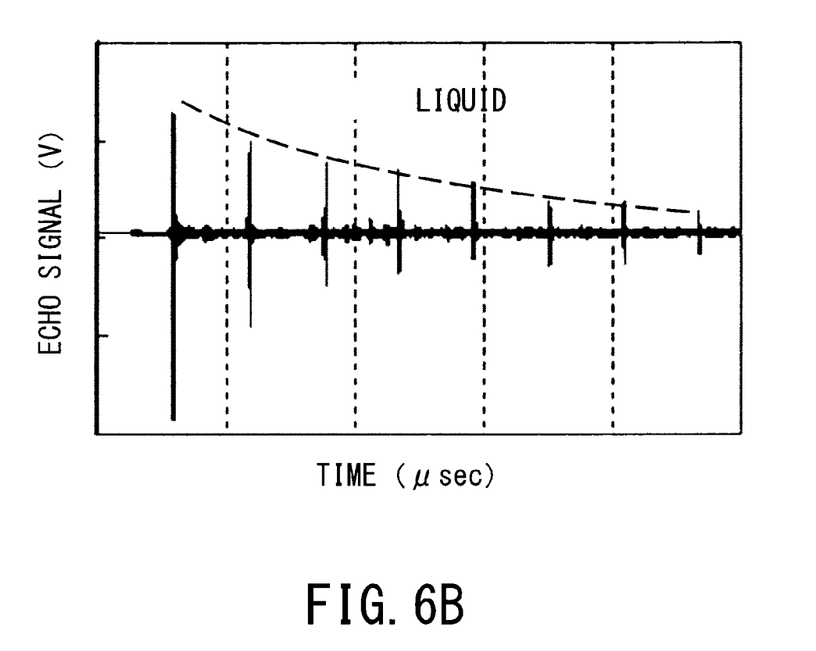
FIG. 6(B) is a graph showing a waveform of an ultrasonic wave (echo signal) reflected on an interface in contact with a liquid.

In a case where the reflection point is in the liquid (FIG. 6(B)), the attenuation coefficient becomes larger than in a case where the reflection point is in the gas (FIG. 6(A)). In this way, the attenuation coefficient of the attenuation curve obtained from the echo signals that are received from the first time to the $N^{th}$ time by each ultrasonic sensor 15 enables determination as to whether the reflection point in the container is in the gas or in the liquid.

According to the second embodiment, because the plurality of echo waves in the n-time reflections (1≤n≤N) are considered, an influence of fluctuations in a single echo wave is reduced, and hence accuracy of the gas/liquid determination can be kept high.

Third Embodiment

Figure 4:
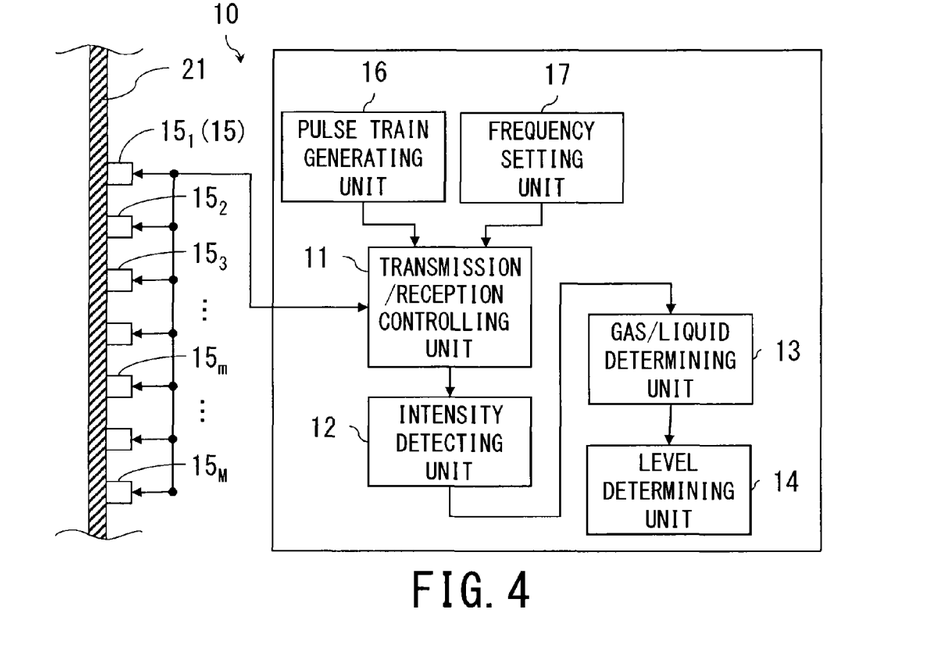
FIG. 4 is a block diagram illustrating a third embodiment of the liquid level measuring apparatus according to the present invention.

As illustrated in FIG. 4, a liquid level measuring apparatus 10 of a third embodiment includes a pulse train generating unit 16 configured to generate an ultrasonic wave made of a plurality of pulse trains, in addition to the configuration (FIG. 1) of the first embodiment.

The transmission/reception controlling unit 11 causes each ultrasonic sensor 15 to transmit the ultrasonic wave made of the pulse trains.

In FIG. 4, portions that are the same as or correspond to those in FIG. 1 are denoted by the same reference signs, and redundant description thereof is omitted.

Figure 5A:
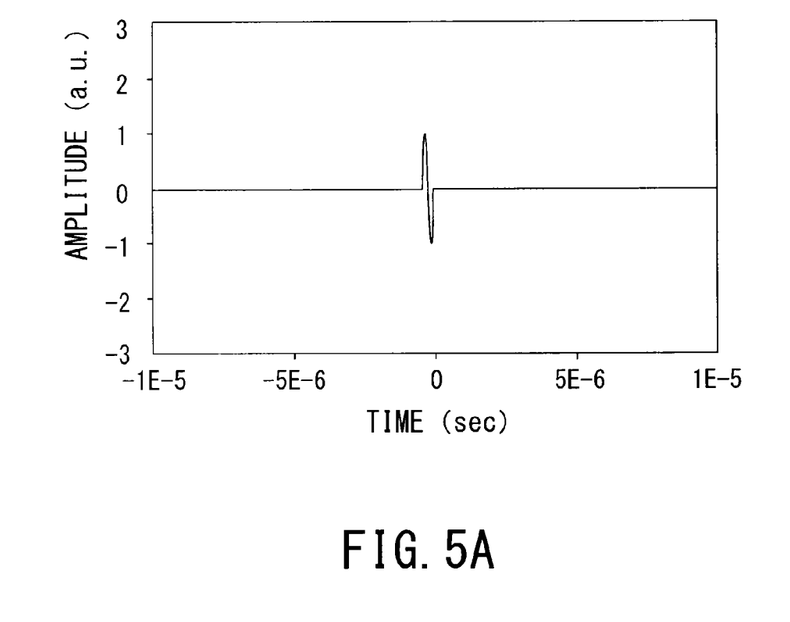
FIG. 5(A) is a graph showing a signal waveform of a single pulse transmitted/received by an ultrasonic sensor.
Figure 5B:
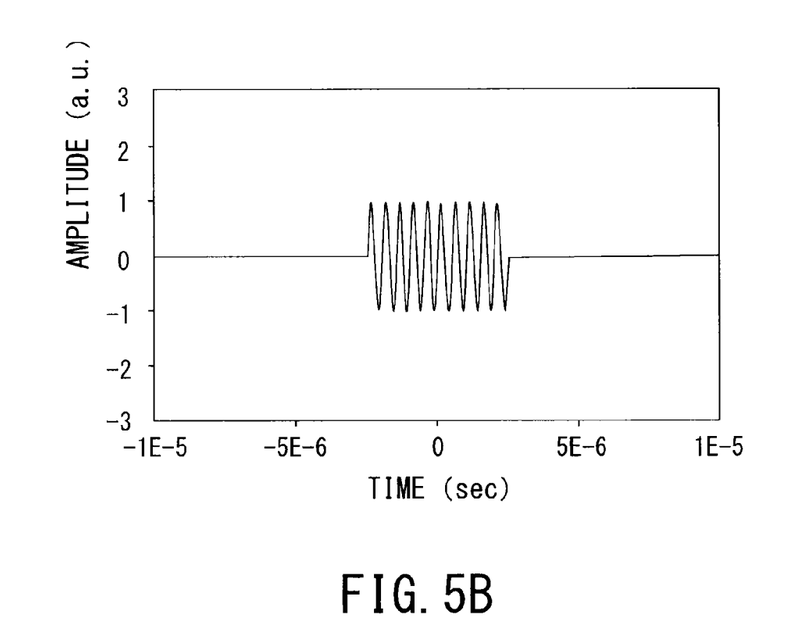
FIG. 5(B) is a graph showing a signal waveform of a pulse train transmitted/received by the ultrasonic sensor.

A transmitted/received ultrasonic wave generally has a waveform similar to a single pulse waveform as shown in FIG. 5(A), whereas a transmitted/received ultrasonic wave in the third embodiment has such a pulse train (number of continuous waves: p=10) as shown in FIG. 5(B).

The pulse train generating unit 16 can freely set the number of continuous waves p, and can set an arbitrary waveform such as a spike pulse waveform and a square waveform.

Here, in a case where the liquid in the container is boiling, stability of the signal intensity of the echo wave becomes lower due to an influence of steam in the gas and voids in the liquid, and hence a decrease in accuracy of the gas/liquid determination is a concern. In view of this, the gas/liquid determination is performed by using the ultrasonic pulse train shown in FIG. 5(B) and calculating an average value of respective intensities of pulses having the number of continuous waves p.

As a result, because an influence of fluctuations in the pulses is reduced by such averaging, even in a case where the liquid in the container is boiling, accuracy of the gas/liquid determination can be kept high.

The liquid level measuring apparatus 10 of the third embodiment further includes a frequency setting unit 17 configured to set a frequency of the ultrasonic wave to a resonance point of the container 21.

The transmission/reception controlling unit 11 causes each ultrasonic sensor 15 to transmit the ultrasonic wave whose frequency is set to the resonance point.

The frequency setting unit 17 can set the frequency of the ultrasonic wave within a range of ten kHz to several tens of MHz. Here, a resonance frequency refers to a frequency at which a length of an integral multiple of half a wavelength of the ultrasonic wave coincides with a thickness of the container. Because a thickness of the reactor pressure vessel is approximately 100 to 300 mm, a lower limit of the set frequency is 10 kHz in a case of using a longitudinal wave. On the other hand, an upper limit of the set frequency is approximately several tens of MHz, which is such a value that does not increase an influence of propagation attenuation in the steel material. The frequency can be changed by changing duration of a pulse voltage.

The signal intensity of the ultrasonic wave received by each ultrasonic sensor 15 is noticeably attenuated by reflection due to a resonance effect. Accordingly, even if the medium in contact with the inner surface of the container is the gas or the liquid and if the difference in reflectance therebetween is slight, the use of the ultrasonic wave having the resonance frequency enables the difference in signal intensity therebetween to noticeably appear.

Further, the number of continuous waves p can be set to ∞, and a continuous ultrasonic sine wave can be transmitted from each ultrasonic sensor 15 to the container 21. The ultrasonic wave is repetitively reflected between the inner surface and the outer surface of the container, and an ultrasonic wave that is transmitted through the outer surface at the time of reflection thereon is received by the ultrasonic sensor 15.

In a liquid level measuring apparatus 10 according to another embodiment, the transmission/reception controlling unit 11 causes each ultrasonic sensor 15 to transmit an ultrasonic wave having a wideband frequency including the resonance point.

The transmission/reception controlling unit 11 in this case can utilize the resonance frequency without frequency adjustment, and hence the frequency setting unit 17 is unnecessary. In this case, it is desirable to use, as the ultrasonic sensor 15, a composite probe that can transmit/receive an ultrasonic wave having a wide frequency bandwidth.

This enables transmission/reception of a wideband ultrasonic wave including the resonance frequency corresponding to the thickness of the container 21, and can increase detection sensitivity of the ultrasonic wave without frequency adjustment work. Note that the number of resonance points is not one but more than one, and a wideband frequency including the plurality of resonance points can be selected.

The liquid level measuring apparatus of at least one embodiment described above performs the gas/liquid determination on a basis of an ultrasonic wave that is attenuated after being reflected twice or more, of ultrasonic waves that are multiply reflected between the inner surface and the outer surface of the container. This enables highly accurate measurement of the liquid level formed by the liquid containing voids and the gas containing steam.

Although some embodiments of the present invention have been described, these embodiments are presented as mere examples, and are not intended to limit the scope of the present invention. These embodiments can be carried out in various other modes, and can be variously omitted, replaced, changed, and combined within a range not departing from the gist of the present invention. These embodiments and modifications thereof are included in the scope and gist of the present invention, and are also included in the invention described in CLAIMS and a range equivalent thereto.

Components of the liquid level measuring apparatus can be implemented by a processor of a computer, and a plurality of processors can be operated by a liquid level measuring program.

REFERENCE SIGNS LIST

10 . . . liquid level measuring apparatus, 11 . . . transmission/reception controlling unit, 12 . . . intensity detecting unit, 13 . . . gas/liquid determining unit, 14 . . . level determining unit, 15 ($15_1, 15_2, 15_m, 15_M$) . . . ultrasonic sensor, 16 . . . pulse train generating unit, 17 . . . frequency setting unit, 18 . . . attenuation coefficient deriving unit, 21 . . . container, 22 . . . liquid, 23 . . . liquid level, 24 . . . gas

The invention claimed is:

1. A liquid level measuring apparatus comprising:
ultrasonic sensors each configured to transmit and receive an ultrasonic wave, the ultrasonic sensors being respectively set at a plurality of positions on an outer surface of a container that stores at least one of a liquid or a gas;
a transmission/reception controlling unit configured to set, as a target, any one of the ultrasonic sensors at the plurality of positions and control the transmission and reception of the ultrasonic wave of the target;
an intensity detecting unit configured to detect an intensity of the ultrasonic wave that satisfies at least $2 \leq N$ (N: natural number), of the ultrasonic waves that are reflected N times on an inner surface of the container;
a gas/liquid determining unit configured to determine which of the liquid and the gas a reflection point on the inner surface is in contact with, on a basis of the detected intensity of the ultrasonic wave;
a level determining unit configured to determine a liquid level of the liquid on a basis of gas/liquid determination results respectively derived by the ultrasonic sensors at the plurality of positions; and
a pulse train generating unit configured to generate the ultrasonic wave made of a plurality of pulse trains with a set number of continuous waves p, wherein
the transmission/reception controlling unit is configured to cause each of the ultrasonic sensors to transmit the ultrasonic wave made of the pulse trains, and
the gas/liquid determining unit is configured to calculate an average value of respective intensities of pulses having the number of continuous waves p.

2. The liquid level measuring apparatus according to claim 1, further comprising an attenuation coefficient deriving unit configured to derive an attenuation coefficient of the ultrasonic wave on a basis of an intensity that is attenuated after the N-time reflections, wherein
the gas/liquid determining unit determines which of the liquid and the gas the reflection point on the inner surface is in contact with, on a basis of the attenuation coefficient.

3. The liquid level measuring apparatus according to claim 1, further comprising a frequency setting unit configured to set a frequency of the ultrasonic wave to a resonance point of the container, wherein
the transmission/reception controlling unit causes each of the ultrasonic sensors to transmit the ultrasonic wave whose frequency is set to the resonance point.

4. The liquid level measuring apparatus according to claim 1, wherein
the transmission/reception controlling unit causes each of the ultrasonic sensors to transmit an ultrasonic wave having a wideband frequency including a resonance point of the container.

5. The liquid level measuring apparatus according to claim 1, wherein
each of the ultrasonic sensors is an electromagnetic ultrasonic probe formed by a magnet and a coil.

6. A liquid level measuring method comprising the steps of:
setting, as a target, any one of ultrasonic sensors each configured to transmit and receive an ultrasonic wave, and controlling the transmission and reception of the ultrasonic wave of the target, the ultrasonic sensors being respectively set at a plurality of positions on an outer surface of a container that stores at least one of a liquid or a gas;
detecting an intensity of the ultrasonic wave that satisfies at least $2 \leq N$ (N: natural number), of the ultrasonic waves that are reflected N times on an inner surface of the container;
determining which of the liquid and the gas a reflection point on the inner surface is in contact with, on a basis of the detected intensity of the ultrasonic wave;
determining a liquid level of the liquid on a basis of gas/liquid determination results respectively derived by the ultrasonic sensors at the plurality of positions; and
generating the ultrasonic wave made of a plurality of pulse trains with a set number of continuous waves p, wherein
each of the ultrasonic sensors is caused to transmit the ultrasonic wave made of the pulse trains, and
an average value of respective intensities of pulses having the number of continuous waves p is calculated.

7. A non-transitory computer readable recording medium storing a program which causes the computer to execute:
setting, as a target, any one of ultrasonic sensors each configured to transmit and receive an ultrasonic wave, and controlling the transmission and reception of the ultrasonic wave of the target, the ultrasonic sensors being respectively set at a plurality of positions on an outer surface of a container that stores at least one of a liquid or a gas;
detecting an intensity of the ultrasonic wave that satisfies at least $2 \leq N$ (N: natural number), of the ultrasonic waves that are reflected N times on an inner surface of the container;
determining which of the liquid and the gas a reflection point on the inner surface is in contact with, on a basis of the detected intensity of the ultrasonic wave; and
determining a liquid level of the liquid on a basis of gas/liquid determination results respectively derived by the ultrasonic sensors at the plurality of positions; and
generating the ultrasonic wave made of a plurality of pulse trains with a set number of continuous waves p, wherein
each of the ultrasonic sensors is caused to transmit the ultrasonic wave made of the pulse trains, and
average value of respective intensities of pulses having the number of continuous waves p is calculated.

* * * * *